(12) United States Patent
LaRoche et al.

(10) Patent No.: US 12,305,751 B2
(45) Date of Patent: May 20, 2025

(54) WHEEL SLIP FLARE CONTROLLER USING CLUTCH CONTROL

(71) Applicant: FORD GLOBAL TECHNOLOGIES, LLC, Dearborn, MI (US)

(72) Inventors: Cory Benson LaRoche, Commerce Township, MI (US); Bradley Dean Riedle, Northville, MI (US); Stephen Michael Cicala, Dearborn Heights, MI (US); Jianping Zhang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/975,106

(22) Filed: Oct. 27, 2022

(65) Prior Publication Data

US 2024/0141987 A1 May 2, 2024

(51) Int. Cl.
*F16H 61/04* (2006.01)
*F16H 59/40* (2006.01)
*F16H 59/50* (2006.01)
*F16H 61/28* (2006.01)

(52) U.S. Cl.
CPC ......... *F16H 61/2807* (2013.01); *F16H 59/40* (2013.01); *F16H 59/50* (2013.01); *F16H 2059/506* (2013.01)

(58) Field of Classification Search
CPC ...... F16H 61/2807; F16H 59/40; F16H 59/50; F16H 2059/506
See application file for complete search history.

(56) References Cited

U.S. PATENT DOCUMENTS

| 4,936,405 | A | 6/1990 | Hrovat | |
| 6,015,020 | A * | 1/2000 | Sugiyama | F16H 61/0213 701/55 |
| 9,404,575 | B2 | 8/2016 | Somerville et al. | |
| 10,343,687 | B2 * | 7/2019 | Leone | B60W 10/02 |
| 10,407,072 | B2 | 9/2019 | Hertel et al. | |
| 2002/0198078 | A1 * | 12/2002 | Mori | F16H 61/0213 477/114 |
| 2005/0096820 | A1 | 5/2005 | Soliman et al. | |
| 2007/0095589 | A1 | 5/2007 | Tamai et al. | |
| 2015/0184740 | A1 * | 7/2015 | Masunaga | F16H 61/0213 701/51 |
| 2017/0066448 | A1 * | 3/2017 | Hertel | B60L 3/10 |
| 2018/0023694 | A1 * | 1/2018 | Chimbe | F16H 61/0213 701/66 |

(Continued)

FOREIGN PATENT DOCUMENTS

| EP | 2767733 A1 * | 8/2014 | B60K 28/16 |
| JP | 2005106087 A * | 4/2005 | F16H 61/04 |

*Primary Examiner* — Tisha D Lewis
(74) *Attorney, Agent, or Firm* — Vincent Mastrogiacomo; Brooks Kushman P.C.

(57) ABSTRACT

A method is proposed to complete a power-on upshift while a vehicle encounters wheel slip conditions such as driving in loose sand. The wheels slip conditions may be detected based on a maximum rate of change of an output shaft exceeding a threshold. In response to the wheel slip conditions, one or more shift parameters may be adjusted to bias the shift toward a tie-up and decrease the chance of a flare. These modified shift parameters may include an increased stroke pressure, a delayed off-going clutch release timing, and an increased ratio change capacity.

5 Claims, 5 Drawing Sheets

(56) References Cited

U.S. PATENT DOCUMENTS

2018/0170355 A1* 6/2018 Kobayashi ............ B60W 30/19
2018/0229712 A1  8/2018 Shelton et al.
2018/0372214 A1* 12/2018 Haria .................. F16H 61/0437

* cited by examiner

WHEEL SLIP FLARE CONTROLLER USING CLUTCH CONTROL

TECHNICAL FIELD

The disclosure relates to the field of automatic transmission shift control. More particularly, the disclosure relates to adjusting shift parameters based on a wheel slip condition.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for increased performance. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

During a shift between speed ratios, at least one clutch, called an off-going clutch, is released and at least one other clutch, called an on-coming clutch, is engaged. A power-on shift to a lower speed ratio, commonly called an upshift, typically involves several distinct phases: a preparation phase, a torque transfer phase, and an inertia phase. During the preparation phase, the on-coming clutch is prepared for engagement. This may include, for example, commanding fluid pressure for a period of time to move a clutch piston into contact with a clutch pack. During the torque transfer phase, the power transfer path is altered. (The term "torque transfer phase" is sometimes shortened to "torque phase".) During the torque transfer phase, the speed ratio is preferably maintained at or slightly higher than the initial gear speed ratio. If the off-going clutch is released too quickly relative to the engagement of the on-coming clutch, the speed ratio can increase excessively. This phenomenon is called a flare. If the off-going clutch is released too slowly relative to the engagement of the on-coming clutch, called a tie-up condition, the torque ratio drops more than necessary. At the completion of the torque transfer phase, the off-going clutch is no longer transmitting torque, while the on-coming clutch is transmitting torque and is subject to slip. During the inertia phase, the slip across the on-coming clutch is eliminated and the transmission speed ratio is changed to the final gear speed ratio. During the inertia phase, the on-coming clutch torque must be higher than what would be required to transmit the engine combustion torque. The output torque is proportional to the on-coming clutch torque. Engine combustion torque may be intentionally reduced during the inertia phase to reduce the duration of the inertia phase without creating excessive output torque. This may be accomplished by changing spark timing which changes combustion torque more rapidly than other mechanisms of changing combustion torque.

When a vehicle travels on a hard surface such as pavement, it is typically desirable to maintain at most a relatively low degree of wheel slippage. On such surfaces, applying enough wheel torque to cause wheel slip reduces the vehicle's performance and controllability. In the absence of wheel slip, the vehicle inertia is effectively connected to the transmission output. Since the vehicle inertia is typically large relative to the inertia at the transmission input, the transmission output speed changes only slightly during a shift while the speed of the input changes to reflect the changed speed ratio.

SUMMARY

In a first embodiment, a method of controlling a transmission includes upshifting under power in a non-wheel-slip condition and in a wheel-slip condition. Both upshifts are from a first transmission ratio to a second transmission ratio. In the non-wheel-slip condition, a first set of shift parameters are used. In response to the wheel-slip condition, a second set of shift parameters are used which biased towards tie-up relative to the first set of shift parameters. The first set of shift parameters may include a first stroke pressure while the second set of shift parameters includes a second stroke pressure which is greater than the first stroke pressure. The first set of shift parameters may include a first ratio change capacity while the second set of shift parameters includes a second ratio change capacity which is greater than the first ratio change capacity. The first set of shift parameters may include first off-going clutch release timing while the second set of shift parameters includes second off-going clutch release timing which is delayed relative to the first off-going clutch release timing. The second set of shift parameters may result in a shorter torque transfer phase and/or a shorter inertia phase than the first set of shift parameters. The non-wheel-slip condition may be characterized by a derivative of an output shaft speed remaining below a threshold during a first preparatory phase. The wheel-slip condition may be characterized by the derivative of the output shaft speed exceeding the threshold during a second preparatory phase.

In a first embodiment, a method of controlling a transmission includes upshifting under power in with different shift parameters based on whether or not a derivative of an output shaft speed exceeds a threshold during a preparatory phase. In response to the derivative remaining below the threshold, the upshift is completed using a first set of shift parameters. In response to the derivative exceeding the threshold, the upshift is completed using a second set of shift parameters which is biased towards tie-up relative to the first set of shift parameters. The first set of shift parameters may include a first stroke pressure while the second set of shift parameters includes a second stroke pressure which is greater than the first stroke pressure. The first set of shift parameters may include a first ratio change capacity while the second set of shift parameters includes a second ratio change capacity which is greater than the first ratio change capacity. The first set of shift parameters may include first off-going clutch release timing while the second set of shift parameters includes second off-going clutch release timing which is delayed relative to the first off-going clutch release timing. The second set of shift parameters may result in a shorter torque transfer phase and/or a shorter inertia phase than the first set of shift parameters.

A transmission includes an output shaft, on-coming and off-going clutches, and a controller. The output shaft has an output shaft speed. During a power-on first upshift, in response to a derivative of the output shaft speed remaining below a threshold during a preparatory phase of the first upshift, the controller is programmed to release the off-going clutch with first clutch release timing and to engage the on-coming clutch using a first stroke pressure and a first ratio change torque capacity. During a power-on second upshift, in response to the derivative of the output shaft speed exceeding the threshold during a preparatory phase of the second upshift, the controller is programmed to release the off-going clutch with second clutch release timing and to engage the on-coming clutch using a second stroke pressure and a second ratio change torque capacity. The second stroke pressure, second ratio change torque capacity, and second off-going clutch release timing bias a torque transfer phase towards tie-up relative to the first stroke pressure, first ratio change torque capacity, and first off-going clutch release timing. The second stroke pressure may be greater than the first stroke pressure. The second ratio change capacity may be greater than the first ratio change capacity. The second off-going clutch release timing may be delayed relative to the first off-going clutch release timing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
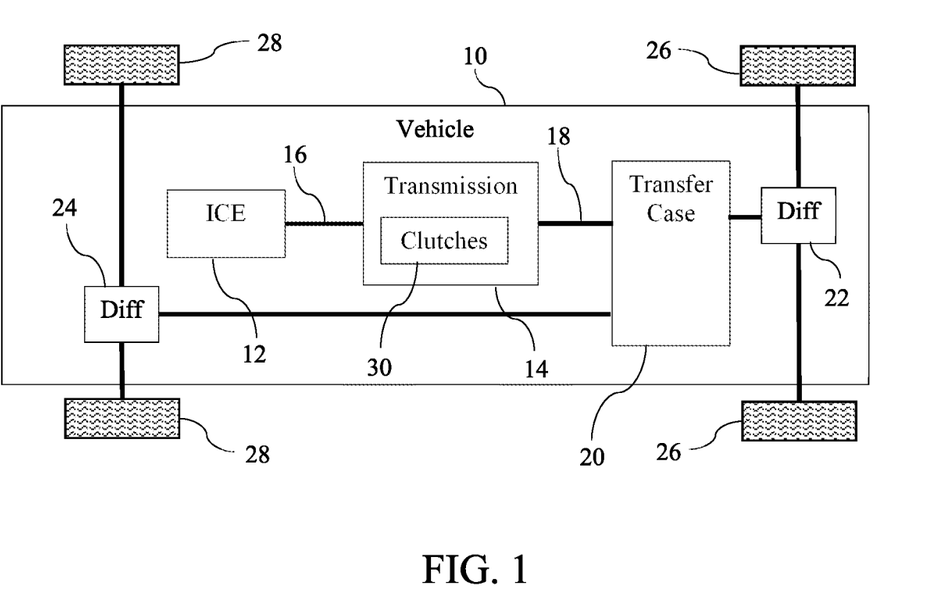
FIG. 1 is a schematic diagram of a four-wheel-drive vehicle powertrain.

FIG. 1 is a schematic diagram of a vehicle 10 with a four-wheel-drive powertrain. Power is provided by an internal combustion engine 12. Transmission 14 adjusts the speed and torque provided by engine 12 based on vehicle driving requirements. Transmission 14 includes an input shaft 16 driven by the engine crankshaft and an output shaft 18 which drives the vehicle wheels via transfer case 20, rear differential 22, and front differential 24. Transfer case may be shiftable between a two-wheel-drive mode in which only rear wheels 26 are powered and a four-wheel-drive mode in which front wheels 28 are also powered. The four-wheel-drive mode may be selected by a driver when wheel traction is limited. Transmission 14 includes a number of clutches 30 which are engaged in various combinations to establish different power flow paths with different speed ratios between the input shaft 16 and the output shaft 18. A shift from one speed ratio to another involves disengaging at least one of these clutches, called the off-going clutch, and engaging at least one of these clutches, called the on-coming clutch.

When a vehicle is driven across loose sand or other similar surface, the relationship between wheel slip and vehicle performance is different than on a hard surface. In this environment, a relatively large degree of wheel slip may be common and even necessary to provide adequate tractive force. If the wheels stop moving relative to the sand, they may "bog down" such that it is difficult to get them slipping again. When the wheels are slipping, the vehicle inertia is not effectively connected to the transmission output. The speed ratio changes that occur during a shift may involve significant changes to both the input shaft speed and the output shaft speed. A flare condition does not necessarily take the form of the input shaft speed increasing but may instead take the form of the output shaft speed decreasing.

Figure 2:
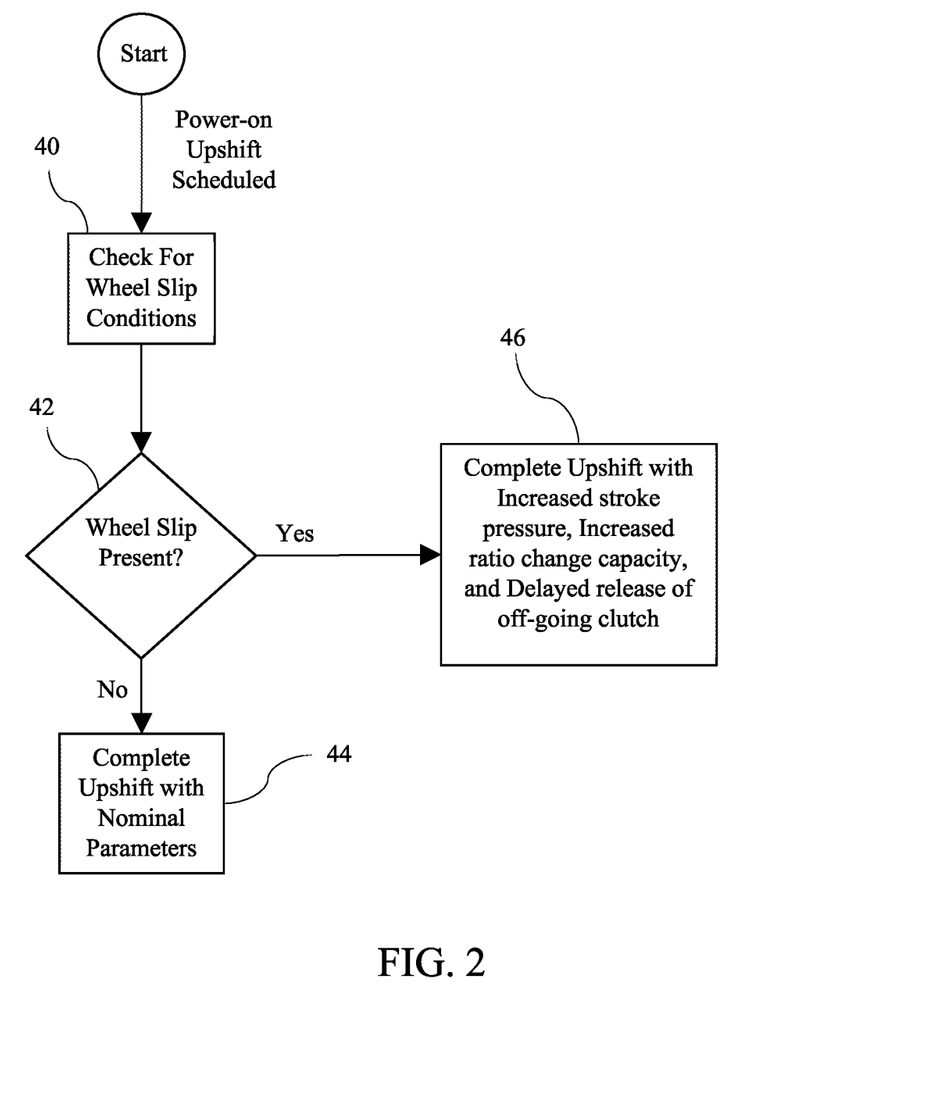
FIG. 2 is a flow chart for a transmission control procedure.

FIG. 2 illustrates a control strategy designed to vary shift parameters in response to the vehicle being in loose sand or similar surface. The method is initiated when a power-on upshift is scheduled by the shift scheduling logic. At 40, the method checks for a wheel slip condition. If the vehicle is in two-wheel-drive, this condition could be detected, for example, by comparing speeds of the rear wheels to the front wheels. A method of detecting wheel slip that is suitable in either two-wheel-drive or four-wheel-drive is discussed below. If wheel slip is not detected at 42, then the upshift is completed at 44 using nominal shift parameters. During vehicle calibration, the nominal shift parameters are selected to provide a comfortable shift when the wheels have good traction. For example, the nominal shift parameters may balance the possibility of a tie-up occurring with the possibility of a flare occurring. The nominal shift parameters are selected to complete the shift gradually enough that it doesn't feel rough and jerky to vehicle occupants while also not feeling like the shift takes too long to complete. If wheel slip is detected at 42, then the upshift is completed at 46 with modified shift parameters selected to reduce the chance of bogging down when it is in sand. Shift parameters that may differ include the stroke pressure, the initial ratio change torque, and the off-going clutch release timing. Relative to the nominal shift parameters, these shift parameters bias the shift toward a tie-up condition to reduce the possibility of a flare occurring. These shift parameters also have the effect of completing the torque transfer phase and the inertia phase more quickly, so there is less opportunity for the wheels to get bogged down even if the output torque drops momentarily.

Figure 3:
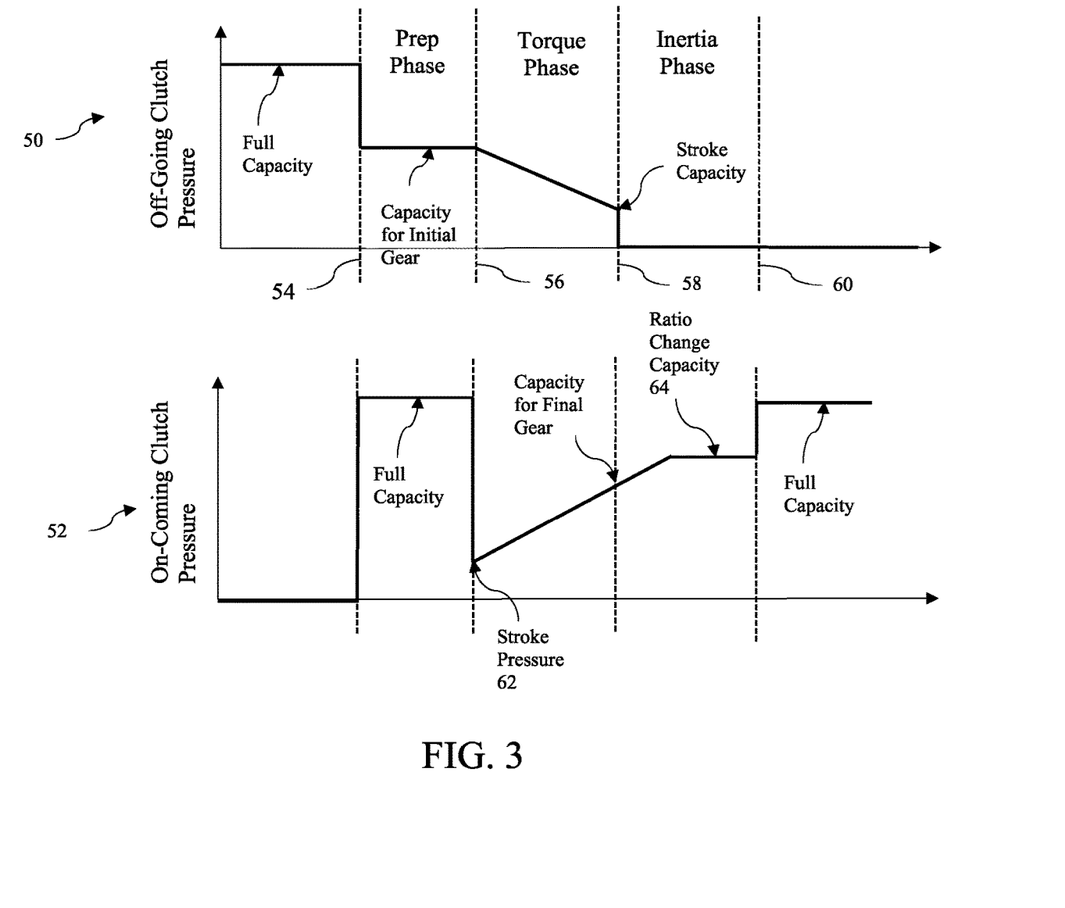
FIG. 3 is a graphical depiction of commanded clutch pressures during a nominal shift according to the transmission control procedure of FIG. 2.

FIG. 3 illustrates the clutch pressure during an upshift with nominal shift parameters, such as the upshift at 44. Graph 50 indicates the commanded pressure to the off-going clutch while graph 52 indicates the commanded pressure to the on-coming clutch. Vertical dotted line 54 indicates the time at which the shift is scheduled. Vertical dotted line 56 indicates the time of the end of the preparatory phase and the beginning of the torque transfer phase. Vertical line 58 indicates the time of the end of the torque transfer phase and the beginning of the inertia phase. Finally, vertical line 60 indicates the time of completion of the upshift. Prior to the shift being scheduled, off-going clutch pressure is at line pressure and the on-coming clutch pressure is at zero.

When the shift is scheduled, the pressure to the off-going clutch may be reduced to the pressure that is calculated to be required to transmit the current input torque in the initial gear ratio. During the preparatory phase, the on-coming clutch pressure is commanded to line pressure for the purpose of rapidly moving the clutch piston into contact with the clutch pack. The torque capacity of the on-coming clutch is still negligible during this phase. Prior to the start of the torque transfer phase, the on-coming clutch pressure is reduced to the stroke capacity 62, which is a pressure calculated to overcome the return spring force such that additional pressure will result in positive clutch capacity.

During the torque transfer phase, the off-going clutch pressure is ramped down while the on-coming clutch pressure is ramped up. This has the effect of gradually switching the power transfer path from the power transfer path associated with the initial gear ratio to the path associated with the final gear ratio. The torque ratio decreases during this phase. At the completion of the torque transfer phase, the off-going clutch pressure may be reduced to zero.

During the inertia phase, the on-coming clutch pressure is ramped to a ratio change capacity 64 which is higher than the level required to transmit combustion torque in the final gear ratio. This extra capacity overcomes inertia to change the speed ratio from the speed ratio associated with the initial gear ratio to the speed ratio associated with the final gear ratio. As mentioned previously, when the wheels have traction, most of the speed ratio change is a reduction in speed of the input shaft. Engine combustion torque may be reduced to shorten the inertia phase. However, the mechanism used to reduce combustion torque must reduce the combustion torque level very quickly while allowing a return to the previous combustion torque level very quickly after the inertia phase completes. Some methods of adjusting combustion torque, such as changes in throttle settings, have too much latency. Changing spark timing is the most common method used.

Figure 4:
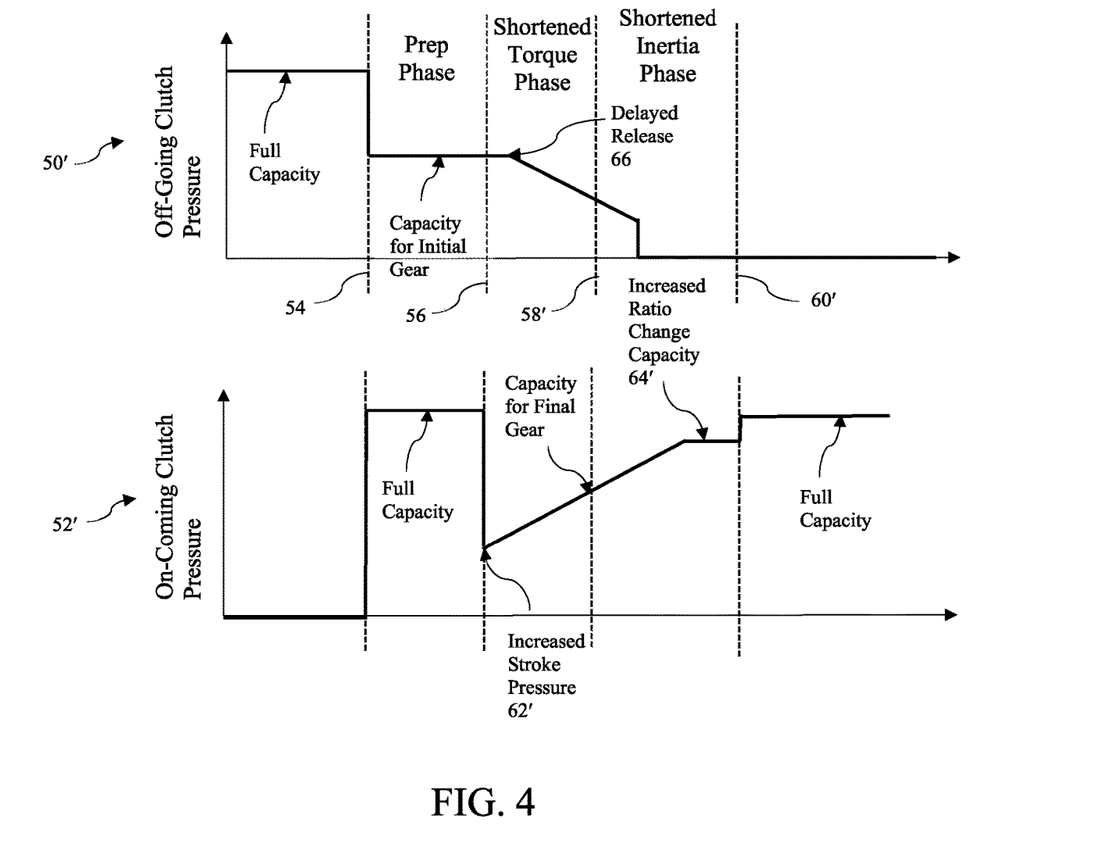
FIG. 4 is a graphical depiction of commanded clutch pressures during a shift during wheel slip conditions according to the transmission control procedure of FIG. 2.

FIG. 4 illustrates how the shift differs when the revised shift parameters are utilized. Graph 50' indicates the commanded pressure of the off-going clutch and graph 52' indicates the commanded pressure of the on-coming clutch during the modified shift. The clutch pressures during the preparatory phase are the same as in the shift illustrated in FIG. 3. During the torque transfer phase, the on-coming clutch pressure is ramped up, but starts from a higher level, increased stroke pressure 62', than in the shift of FIG. 3. The off-going clutch pressure is ramped down at delayed release time 66 which is slightly later than in the shift illustrated in FIG. 3. These changes have the effect of biasing the shift toward tie-up and away from flare. The increased stroke pressure has the effect of reducing the duration of the torque transfer phase.

The inertia phase begins at 58' when the on-coming clutch torque capacity is sufficient to reduce the transmission speed ratio below the speed ratio associated with the initial gear ratio. The off-going clutch may have some remaining torque capacity at time 58'. The pressure to the on-coming clutch continues to ramp up until it reaches ratio change capacity 64' and is then held at that level. Ratio change capacity 64' is higher than ratio change capacity 64 of the shift illustrated in FIG. 3. The increased ratio change capacity has the effect of reducing the duration of the inertia phase. Alternatively, it may reduce the extent to which combustion torque must be reduced. The inertia phase ends at 60' when the transmission speed ratio reaches the speed ratio associated with the final gear ratio.

Figure 5:
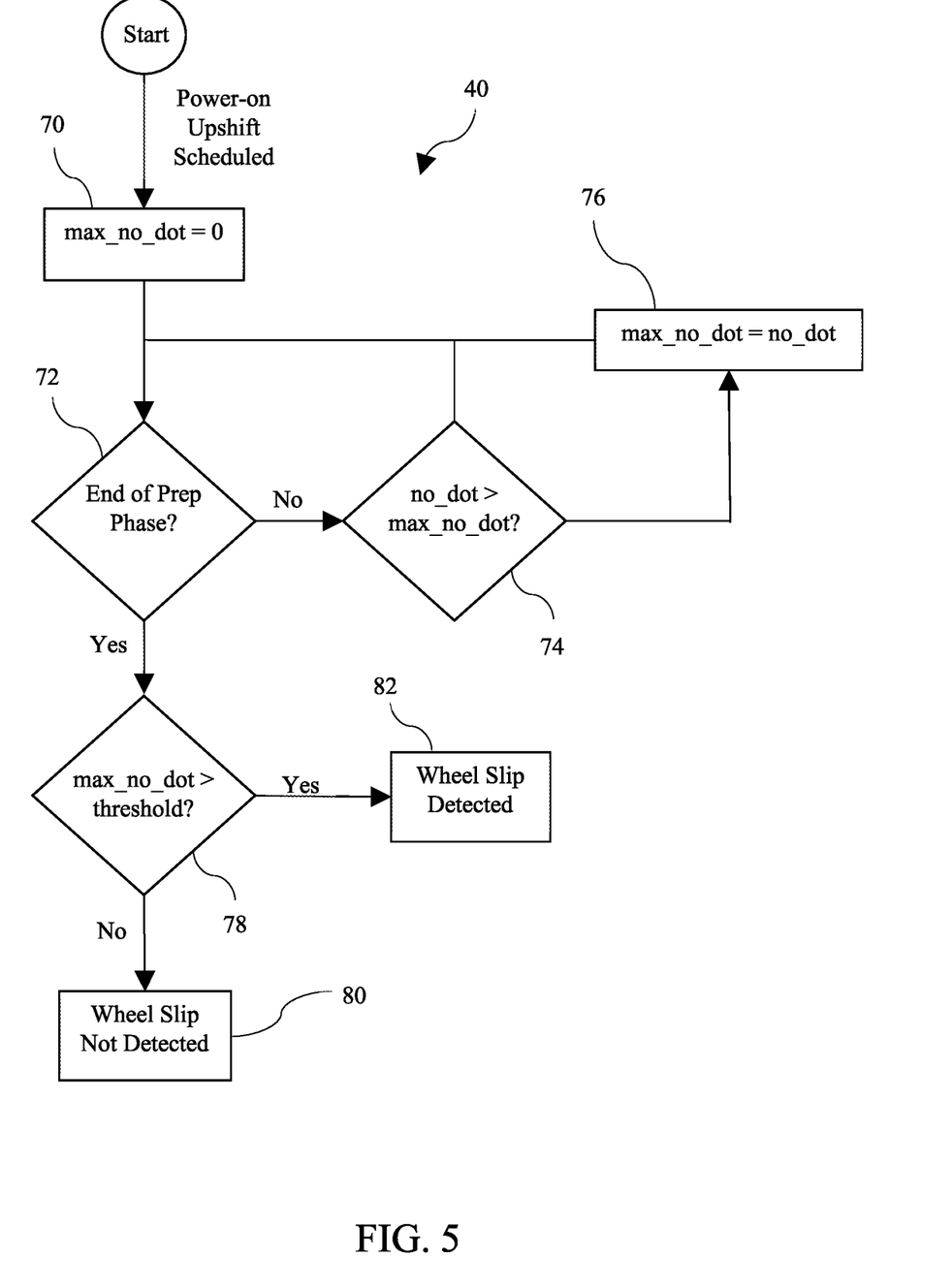
FIG. 5 is a flow chart for a sub-procedure of the procedure of FIG. 2 for detecting the presence of wheel slip.

FIG. 5 illustrates a process for making the determination of whether a wheel-slip condition is present, and therefore whether the shift parameters should be modified as described above. This process may occur during the preparatory phase of a shift. When the power-on upshift is scheduled, a variable max_no_dot is initialized to zero at 70. This variable, represents the maximum of a derivative of the output shaft speed. Alternatively, it could represent the maximum of a derivative of a speed of some other component whose speed is proportional to the speed of the driving wheels. The procedure loops through 72, 74 and 76 until the end of the preparatory phase is detected at 72. At 74, max_no_dot is compared to no_dot. The variable no_dot represents the current derivative of the speed of the output shaft, or of some other component whose speed is proportional to driving wheel speed. A time series of measurements from a speed sensor may be numerically processed (e.g. filtered and differentiated) to calculate the value of no_dot. If no_dot is greater than max_no_dot at 74, then max_no_dot is updated at 76. When the end of the preparatory phase is detected at 72, max_no_dot is compared to a threshold at 78. If max_no_dot is less than the threshold, the procedure concludes that wheel slip is no currently occurring at 80 and the upshift is completed at 44 using nominal parameters. If max_no_dot is greater than the threshold at 78, the procedure concludes at 82 that wheel slip is currently occurring and the upshift is completed at 46 using modified parameters.

In the processes illustrated in FIGS. 2 and 5, a binary determination is made between wheel-slip and non-wheel-slip conditions. In some embodiments, the shift parameters may be adjusted by amounts that depend on the degree of wheel slip detected.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
  an output shaft having an output shaft speed;
  on-coming and off-going clutches; and
  a controller programmed to
    during a power-on first upshift, in response to a derivative of the output shaft speed remaining below a threshold during a preparatory phase of the first upshift, release the off-going clutch with first clutch release timing and engage the on-coming clutch using a first stroke pressure and a first ratio change torque capacity; and during a power-on second upshift, in response to the derivative of the output shaft speed exceeding the threshold during a preparatory phase of the second upshift, release the off-going clutch with second clutch release timing and engage the on-coming clutch using a second stroke pressure and a second ratio change torque capacity; wherein the second stroke pressure, second ratio change torque capacity, and second off-going clutch release timing bias a torque transfer phase towards tie-up relative to the first stroke pressure, first ratio change torque capacity, and first off-going clutch release timing.

2. The transmission of claim 1, wherein the second stroke pressure is greater than the first stroke pressure.

3. The transmission of claim 1, wherein the second ratio change capacity is greater than the first ratio change capacity.

4. The transmission of claim 1, wherein the second off-going clutch release timing is delayed relative to the first off-going clutch release timing.

5. The transmission of claim 1, wherein:
the second stroke pressure is greater than the first stroke pressure;
the second ratio change capacity is greater than the first ratio change capacity; and
the second off-going clutch release timing is delayed relative to the first off-going clutch release timing.

* * * * *